(12) United States Patent
Ohwatari et al.

(10) Patent No.: US 8,385,861 B2
(45) Date of Patent: Feb. 26, 2013

(54) RADIO COMMUNICATION APPARATUS AND RADIO COMMUNICATION METHOD

(75) Inventors: Yusuke Ohwatari, Yokohama (JP);
Anass Benjebbour, Yokosuka (JP);
Tomoyuki Ooya, Yokohama (JP);
Junichiro Hagiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 438 days.

(21) Appl. No.: 12/431,894

(22) Filed: Apr. 29, 2009

(65) Prior Publication Data

US 2009/0280760 A1 Nov. 12, 2009

(30) Foreign Application Priority Data

May 12, 2008 (JP) ................................. 2008-125342

(51) Int. Cl.
*H04B 1/04* (2006.01)
(52) U.S. Cl. ...................... 455/127.2; 455/103; 455/522
(58) Field of Classification Search .................. 455/103, 455/522, 127.2
See application file for complete search history.

(56) References Cited

U.S. PATENT DOCUMENTS

| | | | | |
|---|---|---|---|---|
| 7,633,894 B2 * | 12/2009 | Cruz et al. | ..................... | 370/318 |
| 2009/0016463 A1 * | 1/2009 | Roh | ............................... | 375/295 |

FOREIGN PATENT DOCUMENTS

| JP | 11-308130 | 11/1999 |
|---|---|---|
| WO | WO 2006/098379 | 9/2006 |
| WO | WO 2007/007249 | 1/2007 |

OTHER PUBLICATIONS

G.J. Foschini, et al., "Coordinating multiple antenna cellular networks to achieve enormous spectral efficiency", Mimo Wireless and Mobile Communications, IEE Proceedings Communications, vol. 153, No. 4, Aug. 2006, pp. 548-555.

(Continued)

*Primary Examiner* — Lincoln Donovan
*Assistant Examiner* — Jeffrey Zweizig
(74) *Attorney, Agent, or Firm* — Oblon, Spivak, McClelland, Maier & Neustadt, L.L.P.

(57) ABSTRACT

A disclosed radio communication apparatus transmits a radio signal to multiple users via multiple transmit antenna groups at appropriate transmit power levels, each of the transmit antenna groups including one or more transmit antennas, the transmit antenna groups having respective transmit power constraints. The apparatus includes a precoding unit configured to perform precoding on signals modulated for individual users and generate transmit weights, an optimum transmit power calculation unit configured to receive the transmit weights from the precoding unit and use components of the transmit weights and respective transmit power limit values for the transmit antenna groups to calculate an initial value for a transmit power optimization problem for calculation of the appropriate transmit power levels for the users, and a transmission unit configured to transmit radio signals at the calculated transmit power levels.

14 Claims, 13 Drawing Sheets

OTHER PUBLICATIONS

Shenfa Liu, et al., "Multi-level Zero-forcing Method for Multiuser Downlink System with Per-antenna Power Constraint", VTC2007-Spring, Apr. 2007, pp. 2248-2252.

Wei Yu, et al., "Transmitter Optimization for the Multi-Antenna Downlink With Per-Antenna Power Constraints", IEEE Transactions on Signal Processing, vol. 55, No. 6, Jun. 2007, pp. 2646-2660.

Extended European Search Report issued Feb. 13, 2012, in Patent Application No. 09251185.6.

Antti Tölli, et al., "Cooperative MIMO-OFDM Cellular System with Soft Handover between Distributed Base Station Antennas", IEEE Transactions on Wireless Communications, vol. 7, No. 4, XP 11226328, Apr. 2008, pp. 1428-1440.

M. Codreanu, et al., "MIMO Downlink Weighted Sum Rate Maximization with Power Constraints per Antenna Groups", IEEE Vehicular Technology Conference, Proceedings, XP 31092990, Apr. 2007, pp. 2048-2052.

Japanese Office Action dated Sep. 27, 2012, in corresponding Japanese application No. 2008-125342, with English translation.

* cited by examiner

FIG.4
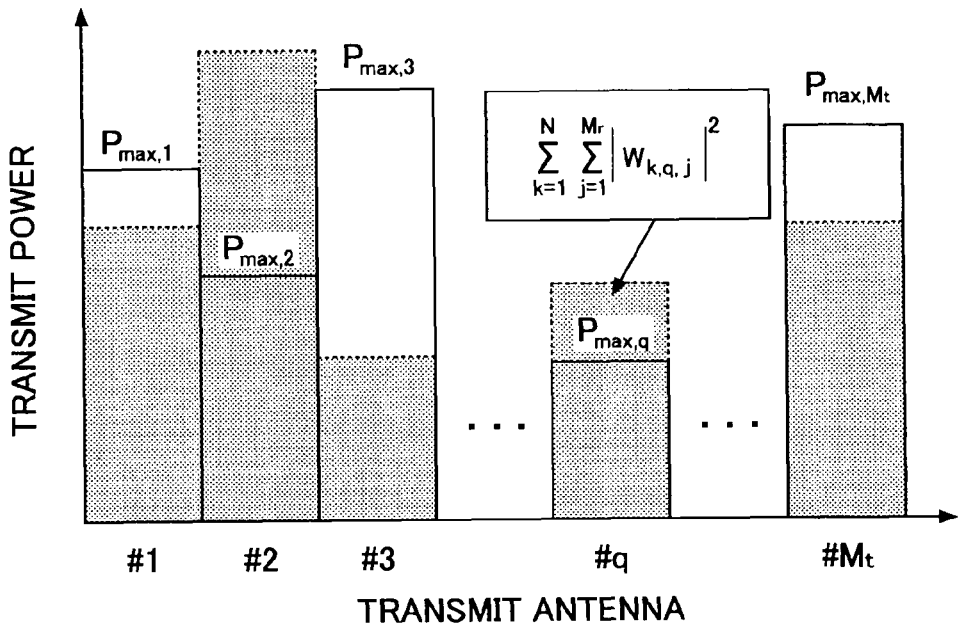
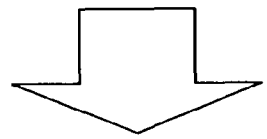
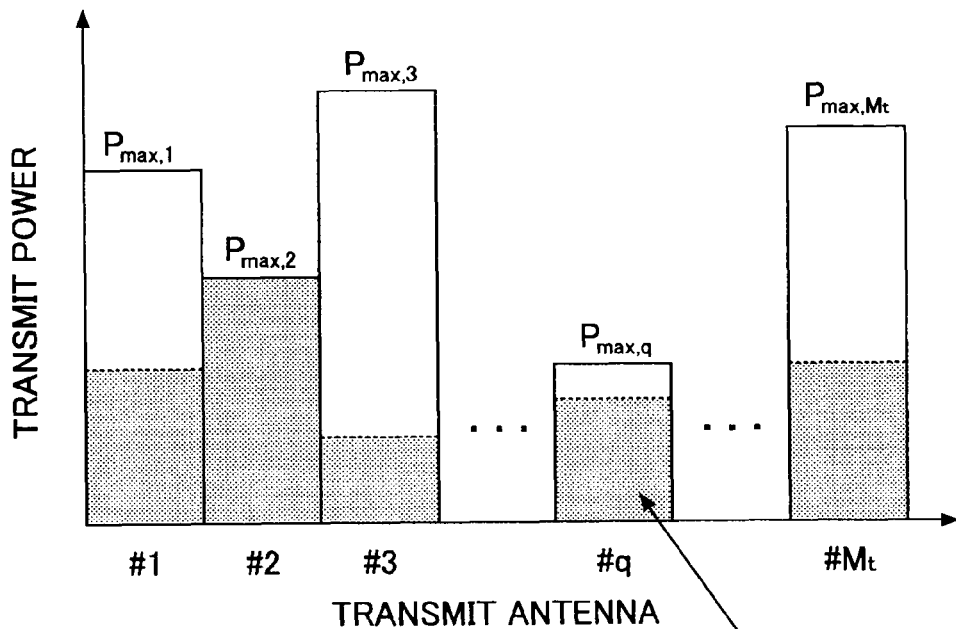

RADIO COMMUNICATION APPARATUS AND RADIO COMMUNICATION METHOD

BACKGROUND OF THE INVENTION

1. Field of the Invention

Embodiments discussed herein are directed to an apparatus and method for radio communication under the condition where some constraints on transmit power levels are applied for each transmit antenna or each group of transmit antennas in multi-user MIMO downlinks.

2. Description of the Related Art

In recent years, a MIMO (Multiple-Input Multiple-Output) transmission scheme has been intensively investigated for improvement of frequency or spectral efficiency and increase in communication capacity. In this MIMO transmission scheme, a multi-user (MU)-MIMO system designed to apply the MIMO transmission scheme to multiple users for further improvement of the spectral efficiency is attracting attention. Furthermore, a system designed for MU-MIMO coordinated base stations transmission is being studied, and it is reported that it can realize significant improvement of throughput.

In this MU-MIMO coordinated base stations transmission system, since different power amplifiers are used for different antennas of base stations or different base stations, respective characteristics of the power amplifiers must be taken into account. Particularly if data streams transmitted from users are precoded based on feedback information such as channel information supplied from the users, the levels of transmit power allocated for the different streams transmitted from the users depending on precoding weights of transmit antennas must be adjusted each time of updating the feedback information such as the channel information because of constraints on transmit power imposed on the base stations.

A first article G. J. Foschini, K. Karakayali and R. A. Valenzuela, "Coordinating multiple antenna cellular networks to achieve enormous spectral efficiency", IEE Proceedings Communications, vol. 153, No. 4, pp. 548-555, August 2006 discloses that block diagonalization zero-forcing, which is a precoding scheme designed for transmission without interference among individual users, is used in a MU-MIMO coordinated base stations transmission system in consideration of respective characteristics of individual power amplifiers to propose and solve a transmit power optimization problem that can realize uniform allocation of channel capacity to individual users. In this article, it is also shown that this approach can significantly improve the channel capacity compared to systems without the coordination among base stations.

A second article S. Liu, N. Hu, Z. He, K. Niu and W. Wu, "Multi-level zero-forcing method for multiuser downlink system with per-antenna power constraint", VTC 2007-Spring, pp. 2248-2252, April 2007 discloses optimization problems for optimizing transmit weights and transmit power for precoding in the above MU-MIMO coordinated base stations transmission system such that the channel capacity of the overall system can be maximized. In this article, it is also shown that this approach can improve the channel capacity.

A third article W. Yu and T. Lan, "Transmitter optimization for the multi-antenna downlink with per-antenna power constraints", IEEE Trans., Signal Processing, pp. 2646-2660, June 2007 discloses an optimization problem using duality of uplink and downlink and a solution method in the above MU-MIMO coordinated base stations transmission system.

The power allocation optimization problems as stated above correspond to constrained nonlinear optimization problems, and higher computational complexity may be required to solve them. For example, in the case where the power allocation optimization problems are solved with use of an interior point method in accordance with a steepest descent method, the solution can be analytically obtained in a relatively simple algorithm, but higher computational complexity may be required for convergence.

The first and second articles, however, have no investigation on reduction in the computational complexity for solving the optimization problems as proposed in the articles.

Also, the third article is directed to only linear precoding and makes no mention of nonlinear precoding.

SUMMARY OF THE INVENTION

Accordingly, it is an object of the present invention to provide radio communication apparatus and method that can calculate an optimum transmit power allocation to individual users while reducing the computational complexity associated with that calculation under the situation where respective transmit power levels are constrained for different transmit antennas and different groups of transmit antennas.

One aspect of the present invention relates to a radio communication apparatus for transmitting a radio signal to multiple users via multiple transmit antenna groups at appropriate transmit power levels, each of the transmit antenna groups including one or more transmit antennas, the transmit antenna groups having respective transmit power constraints comprising: a precoding unit configured to perform precoding on signals modulated for individual users and generate transmit weights; an optimum transmit power calculation unit configured to receive the transmit weights from the precoding unit and use components of the transmit weights and respective transmit power limit values for the transmit antenna groups to calculate an initial value for a transmit power optimization problem for calculation of the appropriate transmit power levels for the users; and a transmission unit configured to transmit radio signals at the calculated transmit power levels.

Another aspect of the present invention relates to a radio communication method for transmitting a radio signal to multiple users via multiple transmit antenna groups at appropriate transmit power levels, each of the transmit antenna groups including one or more transmit antennas, the transmit antenna groups having respective transmit power constraints the method comprising: performing precoding on signals modulated for individual users and generating transmit weights; receiving the transmit weights from the precoding unit and using components of the transmit weights and respective transmit power limit values for the transmit antenna groups to calculate an initial value for a transmit power optimization problem for calculation of the appropriate transmit power levels for the users; and transmitting radio signals at the calculated transmit power levels.

According to the aspects, optimum transmit power levels can be allocated to individual users while reducing the computational complexity associated with that calculation under the situation where respective transmit power levels are constrained for different transmit antennas and different groups of transmit antennas.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 4 schematically illustrates exemplary initial power allocation values determined by normalizing transmit power limit values with transmit weights in the radio communication apparatus according to the first embodiment;

DETAILED DESCRIPTION OF THE PREFERRED EMBODIMENTS

Figure 1:
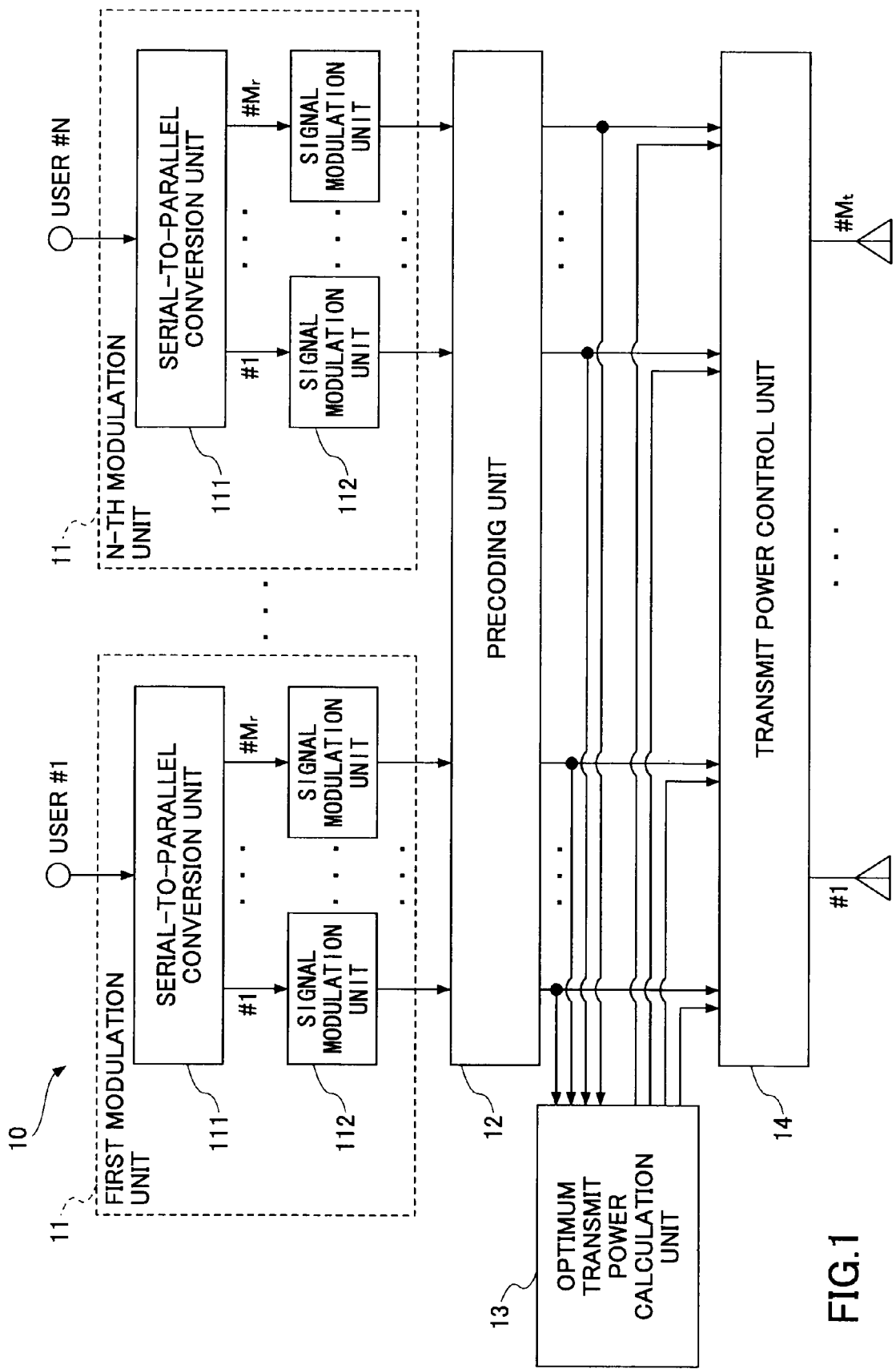
FIG. 1 illustrates an exemplary arrangement of a radio communication apparatus according to a first embodiment.

Embodiments of the present invention are described with reference to the accompanying drawings.

One aspect of the present principle relates to a radio communication apparatus for transmitting a radio signal to multiple users via multiple transmit antenna groups at appropriate transmit power levels, each of the transmit antenna groups including one or more transmit antennas, the transmit antenna groups having respective transmit power constraints comprising: a precoding unit configured to perform precoding on signals modulated for individual users and generate transmit weights; an optimum transmit power calculation unit configured to receive the transmit weights from the precoding unit and use components of the transmit weights and respective transmit power limit values for the transmit antenna groups to calculate an initial value for a transmit power optimization problem for calculation of the appropriate transmit power levels for the users; and a transmission unit configured to transmit signals at the calculated transmit power levels over the air.

According to this aspect, the optimum transmit power calculation unit sets an initial power allocation value for the transmit power optimization problem based on transmit weight components $w_{k,q,j}$, which may solve the optimization problem from the neighborhood of the optimum value compared to cases where such an initial power allocation value is not set. As a result, an optimum transmit power allocation can be achieved within transmit power limit values for individual transmit antennas or individual transmit antenna groups while reducing the number of iterations until convergence and the computational complexity in the optimization problem.

In one embodiment, the initial value may result from normalization of the respective transmit power limit values $P_{max,q}$ for the transmit antenna groups with a function of the transmit weight components $w_{k,q,j}$. According to this embodiment, the initial power allocation value for the transmit power optimization problem can be set based on the transmit weight components $w_{k,q,j}$ under consideration of the transmit power limit values $P_{max,q}$ of the transmit antennas, resulting in reduction in iterations until convergence in the optimization problem and the computational complexity.

In one embodiment, the initial value may result from normalization of the respective transmit power limit values $P_{max,q}$ for the transmit antenna groups with a square sum of the components $w_{k,q,j}$ of the transmit weights. In a further embodiment, the initial value may be a minimum of values for the transmit antenna groups, and the values may result from normalization of the respective transmit power limit values $P_{max,q}$ for the transmit antenna groups with a square sum of the components $w_{k,q,j}$ of the transmit weights. As a result, the initial power allocation value for the transmit power optimization problem can be set to be uniform over individual user streams based on the transmit weight components $w_{k,q,j}$ under consideration of the transmit power limit values $P_{max,q}$ for individual transmit antennas, resulting in reduction in iterations until convergence in the optimization problem and the computational complexity.

In one embodiment, the optimum transmit power calculation unit may be configured to use an interior point method combined with a steepest descent method to perform optimization under the constraints. According to this embodiment, the optimum solution can be analytically obtained through a relatively simple algorithm.

In one embodiment, the optimum transmit power calculation unit may be configured to terminate step iteration in the steepest descent method if any of conditions is satisfied, and the conditions may include a condition of change in values of an objective function derived in accordance with the interior point method with respect to change in transmit power levels being within a predefined threshold, a condition of change in values of an original objective function for the transmit power optimization problem with respect to an increment of the step iteration being within a predefined threshold, and a condition of the number of step iterations exceeding a predefined threshold. According to this embodiment, a convergence point in the steepest descent method can be determined, and the optimum solution can be obtained.

In one embodiment, the optimum transmit power calculation unit may be configured to terminate step iteration in the interior point method if any of conditions is satisfied, and the conditions may include a condition of a barrier parameter for the interior point method being smaller than a predefined threshold, and a condition of change in values of an original objective function for the transmit power optimization problem with respect to an increment of the step iteration being within a predefined threshold. According to this embodiment, a convergence point in the interior point method can be determined, and the optimum solution can be obtained.

In one embodiment, the optimum transmit power calculation unit may be configured to perform optimization under the constraints to make respective channel capacities for the users uniform. According to this embodiment, the optimum solution can be obtained to make respective channel capacities for individual users uniform after power allocation.

In one embodiment, the optimum transmit power calculation unit may be configured to perform optimization under the constraints to maximize channel capacity for an overall system. According to this embodiment, the optimum solution can be obtained to maximize the sum of channel capacities of individual users after power allocation.

The principle of the present invention is to determine transmit power levels for transmit streams for individual users where transmit power levels for individual transmit antenna or transmit antenna groups are constrained and control transmits signals based on the determined transmit power levels.

Some embodiments of the present invention are described with reference to the accompanying drawings.

First Embodiment

FIG. 1 illustrates an exemplary arrangement of a radio communication apparatus 10 according to the first embodiment. As illustrated in FIG. 1, the radio communication apparatus 10 includes a number of modulation units 11 corresponding to the number (N) of users, a precoding unit 12, an optimum transmit power calculation unit 13 and a transmit power control unit 14. Each of the modulation units 11 includes a serial-to-parallel conversion unit 111 and signal modulation units 112.

Figure 2:
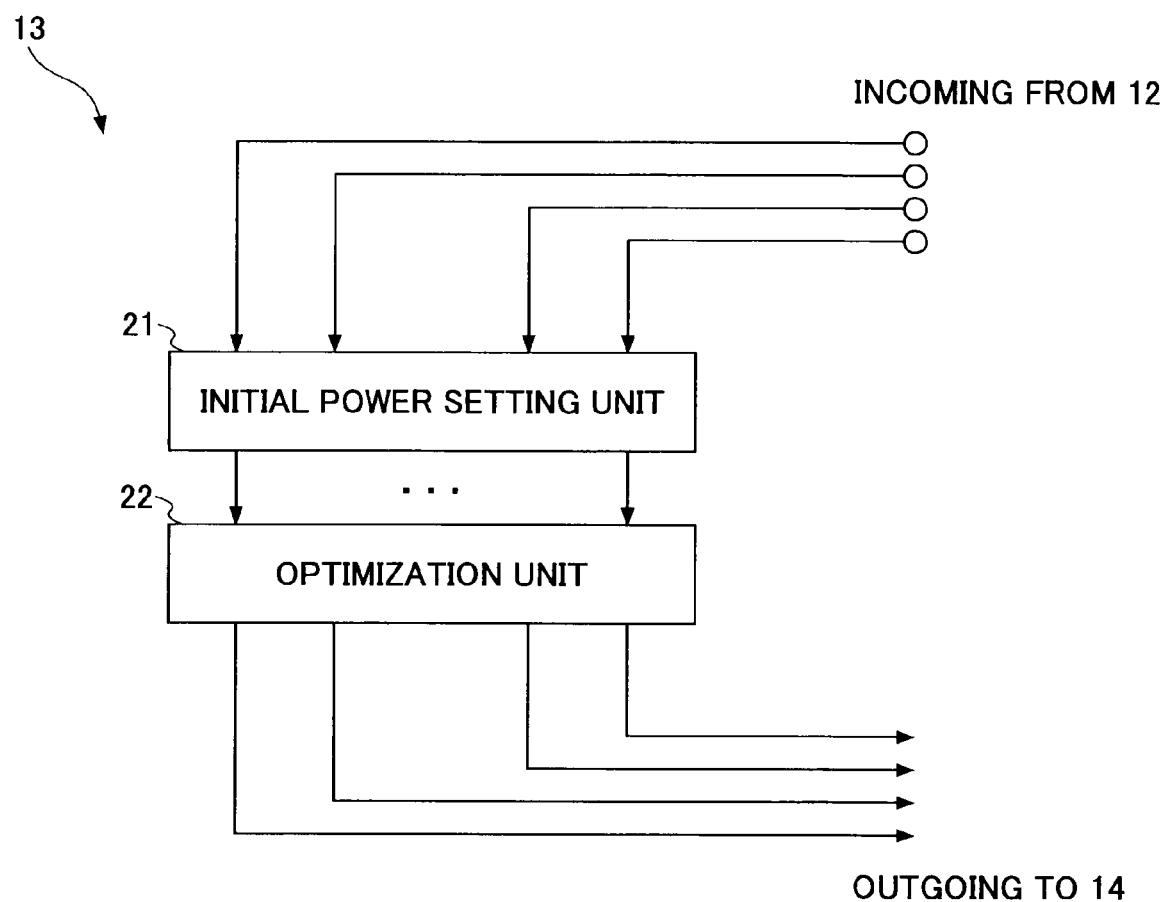
FIG. 2 illustrates an exemplary arrangement of an optimum transmit power calculation unit in the radio communication apparatus according to the first embodiment.

FIG. 2 illustrates an exemplary arrangement of the optimum transmit power calculation unit 13 according to the first embodiment. The optimum transmit power calculation unit 13 includes an initial power setting unit 21 and an optimization unit 22.

Figure 3:
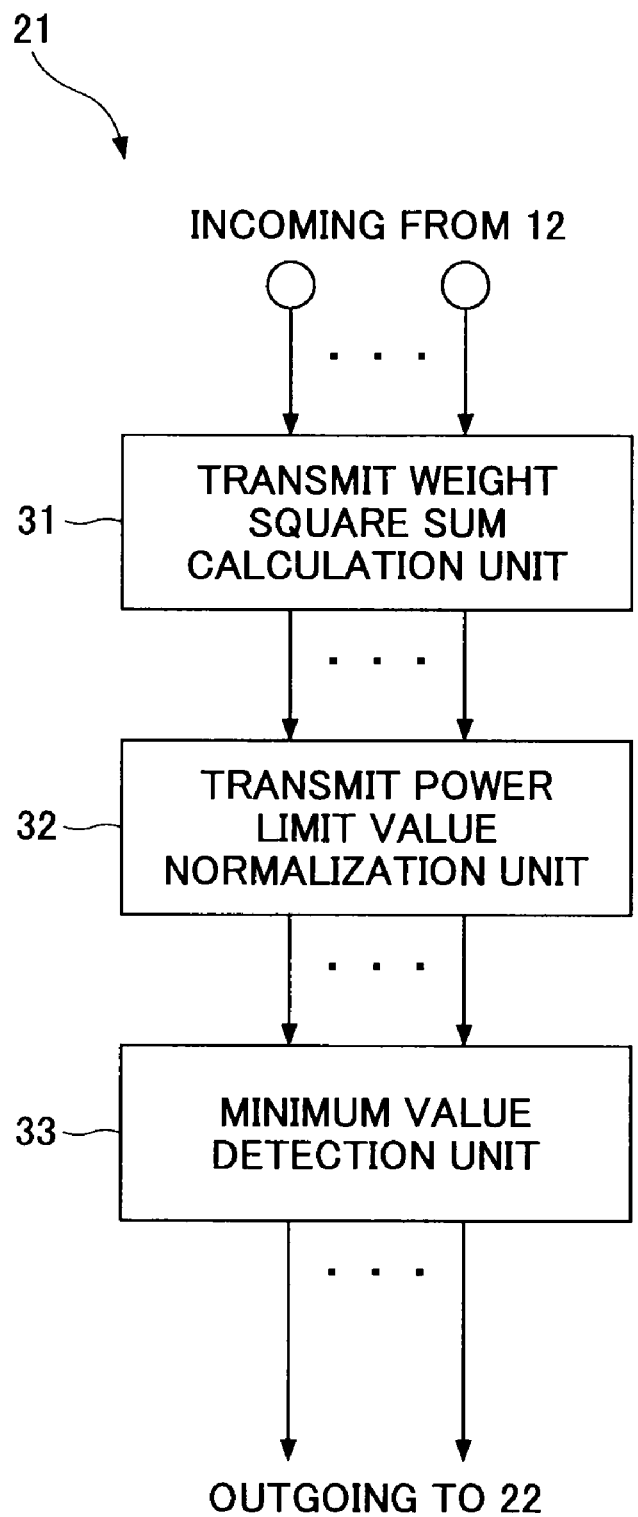
FIG. 3 illustrates an exemplary arrangement of an initial power setting unit in the optimum transmit power calculation unit in the radio communication apparatus according to the first embodiment.

FIG. 3 illustrates an exemplary arrangement of the initial power setting unit 21 according to the first embodiment. The initial power setting unit 21 includes a transmit weight square sum calculation unit 31, a transmit power limit value normalization unit 32 and a minimum value detection unit 33.

Next, exemplary operations of the above-mentioned radio communication apparatus and an exemplary radio communication method according to the first embodiment are described below. In the following, a channel information based block diagonalization zero-forcing (BD-ZF) is used for precoding in MU-MIMO transmission with use of $M_t$ transmit antennas, N users and $M_r$ user antennas.

In other embodiments, any other channel information based MU-MIMO precoder, such as ZF, MMSE or DPC, may be used for the precoding. Alternatively, another type of precoding of selecting transmit weight vectors from a codebook may be used.

In the modulation unit 11 in FIG. 1, the serial-to-parallel conversion unit 111 assigns an information signal sequence to be transmitted to the associated user to individual transmit streams. The signal modulation units 112 modulate the transmit streams and generate transmit signals $s_{k,j}$ ($1 \leq k \leq N$ and $1 \leq j \leq M_r$). The notation $s_{k,j}$ represents a transmit signal for transmitting the j-th transmit stream for the k-th user. A $M_r$-dimensional transmit signal vector $s_k$ for the k-th user is defined as $$s_k = [s_{k,1}, \ldots, s_{k,j}, \ldots s_{k,M_r}]^T \quad (1),$$

where the superscript T represents transposition.

Here, letting a channel matrix of $M_r \times M_t$ MIMO channels for the k-th user be $H_k$, a BD-ZF transmit weight matrix $W_{BD-ZF,k}$ of size $M_t \times M_r$ for the k-th user is generated to satisfy the formula, $$H_k W_{BD-ZF,m} = 0 \; (k \neq m) \quad (2).$$

An equivalent channel matrix $H_k'$ of size $M_r \times M_r$ for the k-th user resulting from application of the BD-ZF is defined as follows and is subjected to singular value decomposition (SVD).

$$H_k' = H_k W_{BD-ZF,k} = U_k \Lambda_k V_k^H \quad (3)$$

$$\Lambda_k = \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix},$$

where the superscript H represents a Hermitian transpose and $\lambda_{k,j}$ represents an eigenvalue of $H_k'^H H_k'$.

Using $V_k$ obtained from the above equation and the $W_{BD-ZF,k}$, let a transmit weight matrix of size $M_t \times M_r$ for the k-th user be $W_k$. In other words, $$W_k = W_{BD-ZF,k} V_k = \begin{bmatrix} w_{k,1,1} & \cdots & w_{k,M_r,1} \\ \vdots & \ddots & \vdots \\ w_{k,1,M_r} & \cdots & w_{k,M_t,M_r} \end{bmatrix}. \quad (4)$$

The precoding unit 12 derives the matrix $W_k$ and supplies components $w_{k,q,j}$ ($1 \leq q \leq M_t$) and $\lambda_{k,j}$ of the matrix $W_k$ as transmit weight related information to the optimum transmit power calculation unit 13. Also, the precoding unit 12 supplies the matrix $W_k$ and the vector $s_k$ to the transmit power control unit 14.

The transmit power control unit 14 in turn uses the supplied $W_k$ and $s_k$ together with transmit power $P_{k,j}$ assigned to the j-th transmit stream for the k-th user that is derived in the optimum transmit power calculation unit 13 as discussed below to generate an $M_t$-dimensional transmit signal vector $x_k$ after the precoding as follows, and supplies the vector $x_k$ to users, $$x_k = W_k \begin{bmatrix} \sqrt{P_{k,1}} & \cdots & 0 \\ \vdots & \ddots & \vdots \\ 0 & \cdots & \sqrt{P_{k,j}} \end{bmatrix} s_k. \quad (5)$$

Also, letting an $M_r$-dimensional received signal vector for the k-th user be $y_k$ and an $M_r$-dimensional noise vector be $n_k$, the received signal will be represented as follows, $$y_k = H_k x_k + n_k \quad (6).$$

Here, letting a received weight matrix of size $M_r \times M_r$ for the k-th user be $U_k^H$ in the formula (3), multiplication of the received weight matrix $U_k^H$ and the received signal vector $y_k$ is represented as follows, $$U_k^H y_k = U_k^H H_k x_k + U_k^H n_k \qquad (7)$$
$$= U_k^H H_k W_{BD-ZF,k} V_k^H P_k s_k + U_k^H n_k$$
$$= \Lambda_k P_k s_k + U_k^H n_k$$
$$= \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix}$$
$$\begin{bmatrix} \sqrt{P_{k,1}} & \cdots & 0 \\ \vdots & \ddots & \vdots \\ 0 & \cdots & \sqrt{P_{k,j}} \end{bmatrix} s_k + U_k^H n_k.$$

Thus, this exhibits that signals that have been spatially multiplexed and transmitted to users can be received without interference. Also, letting the noise power be $\sigma^2$, a received $SNR_{k,j}$ for the j-th transmit stream for the k-th user is represented as follows, $$SNR_{k,j} = \frac{\lambda_{k,j} P_{k,j}}{\sigma^2}. \qquad (8)$$

Using this received $SNR_{k,j}$, a MIMO channel capacity $C_k$ for the k-th user is represented as follows, $$C_k = \sum_{j=1}^{M_r} \log_2(1 + SNR_{k,j}) \qquad (9)$$
$$= \sum_{j=1}^{M_r} \log_2\left(1 + \frac{\lambda_{k,j} P_{k,j}}{\sigma^2}\right).$$

Next, exemplary operations of the optimum transmit power calculation unit 13 are described below. The optimum transmit power calculation unit 13 receives the components $w_{k,q,j}$ of the transmit weight matrix $W_k$ and the eigenvalues $\lambda_{k,j}$ as transmit weight related information from the precoding unit 12 and uses them to derive $P_{k,j}$ to satisfy a transmit power limit value $P_{max,q}$ of the q-th transmit antenna. Specifically, this may correspond to solving an optimization problem as follows, $$\text{maximize} \min_k C_k = \min_k \sum_{j=1}^{M_r} \log_2(1 + SNR_{k,j}) \qquad (10)$$

$$\text{s.t.} \sum_{k=1}^{N} \sum_{j=1}^{M_r} |w_{k,q,j}|^2 P_{k,j} \le P_{max,q} \qquad (11)$$

$$P_{k,j} \ge 0 \, \forall \, k, j. \qquad (12)$$

The formula (10) for the optimization problem means maximization of a minimum user capacity among all users. By solving the optimization problem, the respective channel capacities can be made almost uniform over all the users, which is referred to as Fairness criteria herein.

The optimization problem can be solved based on an interior point method. According to this interior point method, a barrier parameter r(i) for adjusting values of the barrier function $g(P_{k,j})$ is added to the formula (10), and a new optimization problem for maximizing a function without constraints (11) and (12) is solved. Here, the parameter i represents the number of step iterations in the interior point method as discussed in detail below. Specifically, it starts with a greater barrier parameter, and the optimum power $P_{k,j}$ is calculated for each barrier parameter. The calculated value is used as an initial value to iterate the process while decreasing the barrier parameter. Once the barrier parameter r(i) reaches a sufficiently small value, the original constrained optimization problem can be solved. The new optimization problem with use of the barrier function and the barrier parameter can be represented as follows, $$\text{maximize } F = \min_k C_k + r(i) g(P_{k,j}). \qquad (13)$$

The first term of the right-hand side in the formula (13) is one instance of the original objective function associated with the constrained optimization problem on the channel capacities for users. The parameter F is one instance of an objective function derived in accordance with the interior point method by addition of the barrier function and the barrier parameter for adjusting values of the barrier function to the original objective function and serves as an objective function for the new optimization problem.

In some embodiments, the barrier function $g(P_{k,j})$ may be a function including transmit weights, transmit power limit values and/or transmit power values. For example, the barrier function as presented below may be used, $$g(P_{k,j}) = -\sum_{q=1}^{M_t}\left(P_{max,q} - \sum_{k=1}^{N}\sum_{j=1}^{M_r}|w_{k,q,j}|^2 P_{k,j}\right)^{-1} - \sum_{k=1}^{N}\sum_{j=1}^{M_r}(P_{k,j})^{-1}. \qquad (14)$$

In another example, the barrier function $g(P_{k,j})$ as presented below may be used, $$g(P_{k,j}) = \sum_{q=1}^{M_t}\log\left(P_{max,q} - \sum_{k=1}^{N}\sum_{j=1}^{M_r}|w_{k,q,j}|^2 P_{k,j}\right) + \sum_{k=1}^{N}\sum_{j=1}^{M_r}\log(P_{k,j}). \qquad (15)$$

Next, exemplary operations of the initial power setting unit 21 illustrated in FIG. 2 are described with reference to FIG. 3. The components $w_{k,q,j}$ incoming from the optimum transmit power calculation unit 13 are supplied to the transmit weight square sum calculation unit 31. The transmit weight square sum calculation unit 31 calculates a square sum of $w_{k,q,j}$ for each transmit antenna in accordance with the formula $$\sum_{k=1}^{N}\sum_{j=1}^{M_r}|w_{k,q,j}|^2 \qquad (16)$$

and supplies the square sum to the transmit power limit value normalization unit 32.

The transmit power limit value normalization unit 32 stores transmit power limit values $P_{max,q}$ for individual transmit antennas and normalizes $P_{max,q}$ to the received square sums of $w_{k,q,j}$ for the respective transmit antennas in accordance with the formula $$\frac{P_{max,q}}{\sum_{k=1}^{N} \sum_{j=1}^{M_r} |w_{k,q,j}|^2}. \qquad (17)$$

The transmit power limit value normalization unit 32 supplies the normalized transmit power limit values to the minimum value detection unit 33.

The minimum value detection unit 33 derives the minimum value of the incoming normalized transmit power limit values and sets an initial power allocation value $P_{initial}$ associated with the transmit power optimization problem for individual user streams in accordance with the formula $$P_{initial} = \min_q \left[ \frac{P_{max,q}}{\sum_{k=1}^{N} \sum_{j=1}^{M_r} |w_{k,q,j}|^2} \right]. \qquad (18)$$

The set initial power allocation value $P_{initial}$ is supplied to the optimization unit 22.

FIG. 4 schematically illustrates exemplary setting of the initial power allocation value $P_{initial}$. In FIG. 4, the vertical axis and the horizontal axis represent the level of transmit power and individual transmit antennas, respectively. The illustration in FIG. 4 means that the level of transmit power for the transmit antenna having the minimum of normalized transmit power limit values as represented in the formula (17) is made equal to the transmit power limit value $P_{max,q}$ of that transmit antenna.

In this embodiment, the minimum of the $P_{max,q}$ values normalized with respect to the square sum of $w_{k,q,j}$ for individual transmit antennas is evenly set as the initial power allocation value $P_{initial}$ for individual user streams. In other embodiments, the initial power allocation value $P_{initial}$ may be evenly set for the individual user streams based on values normalized in accordance with the formula (17). Alternatively, the initial power allocation value $P_{initial}$ may be set based on values normalized in accordance with any other suitable function $h(w_{k,q,j})$ including the transmit weight components $w_{k,q,j}$.

Figure 5:
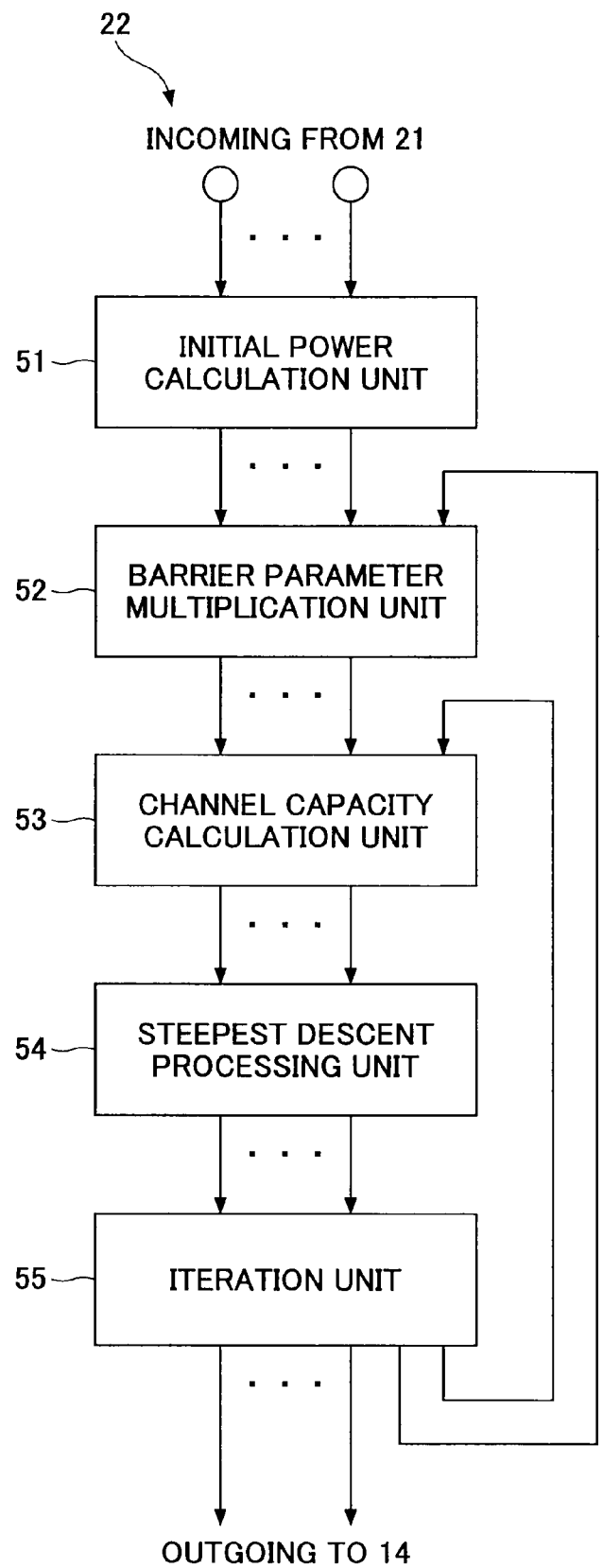
FIG. 5 illustrates an exemplary arrangement of an optimization unit in the optimum transmit power calculation unit in the radio communication apparatus according to the first embodiment.

FIG. 5 illustrates an exemplary arrangement of the optimization unit 22 for optimization in accordance with the interior point method combined with a steepest descent method as discussed below. As illustrated in FIG. 5, the optimization unit 22 includes an initial power calculation unit 51, a barrier parameter multiplication unit 52, a channel capacity calculation unit 53, a steepest descent processing unit 54 and an iteration unit 55.

Figure 6:
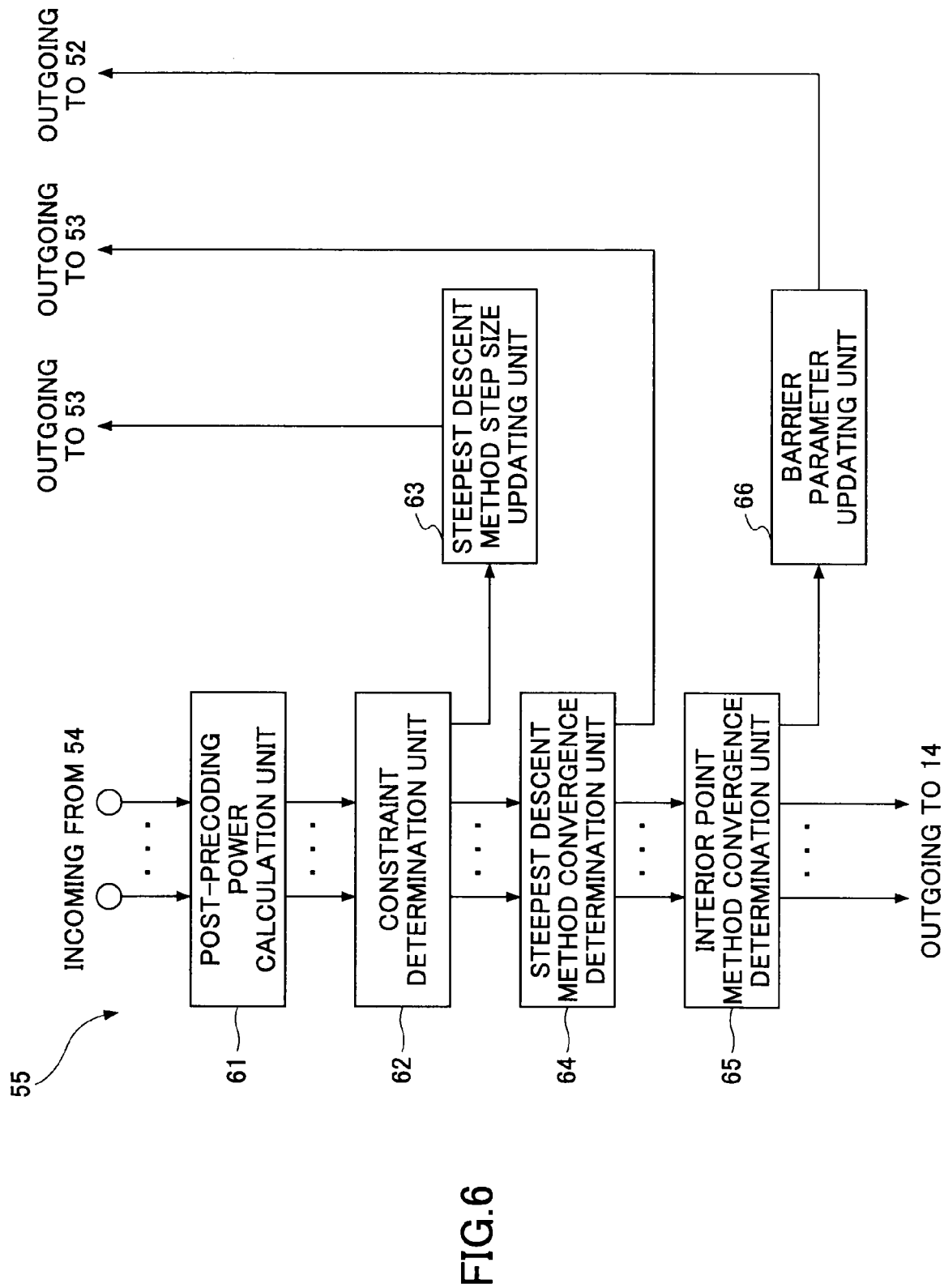
FIG. 6 illustrates an iteration unit in the optimization unit in the optimum transmit power calculation unit in the radio communication apparatus according to the first embodiment.

Next, FIG. 6 illustrates an exemplary arrangement of the iteration unit 55. The iteration unit 55 includes a post-precoding power calculation unit 61, a constraint determination unit 62, a steepest descent step size updating unit 63, a steepest descent operation convergence determination unit 64, an interior point method convergence determination unit 65 and a barrier parameter updating unit 66.

Exemplary detailed operations of the optimization in accordance with the interior point method combined with the steepest descent method is described below. In operation, the initial transmit power value $P_{initial}$ set in the initial power setting unit 21 together with the components $w_{k,q,j}$ and $\lambda_{k,j}$ is supplied to the optimization unit 22. The initial power calculation unit 51 in the optimization unit 22 uses the $P_{initial}$, $w_{k,q,j}$ and $\lambda_{k,j}$ to calculate initial transmit power values $P_q$ for individual transmit antennas in the optimization unit 22 in accordance with the formula (16) and supplies the calculated values to the barrier parameter multiplication unit 52. The barrier parameter multiplication unit 52 multiplies the barrier parameter r(i) with the barrier function. The barrier parameter r(i) herein may be represented as follows, $$r(i+1) = r(i) \times \alpha \qquad (19),$$

where i represents the number of step iterations in the interior point method, and $\alpha(<1)$ represents a barrier parameter scale factor.

Then, the channel capacity calculation unit 53 uses the supplied $P_{k,j}$, $w_{k,q,j}$ and $\lambda_{k,j}$ to calculate channel capacities for individual users in accordance with the formula (9) and supplies the calculated channel capacities to the steepest descent processing unit 54. The steepest descent processing unit 54 performs optimization on the formula (13) associated with the optimization problem using the barrier function in accordance with the steepest descent method. The steepest descent method herein is one method for optimization through use of gradient information in the formula (13). Specifically, iterative operations as defined below are conducted in the steepest descent method, $$P_{k,j}(u+1) = P_{k,j}(u) + \beta \times \frac{\partial}{\partial P_{k,j}} F, \qquad (20)$$

where the parameter u represents the u-th iteration, and the parameter β represents a step size.

The transmit power value $P_{k,j}$ optimized in the steepest descent processing unit 54 is supplied to the iteration unit 55. When the iteration unit 55 receives the transmit power value $P_{k,j}$, the post-precoding power calculation unit 61 in the iteration unit 55 calculates transmit power values $P_q$ for individual transmit antennas based on the incoming $P_{k,j}$ and $w_{k,q,j}$ and supplies the calculated transmit power values $P_q$ to the constraint determination unit 62. The constraint determination unit 62 determines whether constraints as presented below are satisfied, $$\begin{cases} P_q \leq P_{max,q} \\ P_{k,j} \geq 0. \end{cases} \qquad (21)$$

If the constraint determination unit 62 determines that any of the constraints as specified in the formula (21) is not satisfied, the steepest descent method step size updating unit 63 decreases the step size β and supplies it to the channel capacity calculation unit 53. Then, the constraint determination unit 62 uses the $P_{k,j}$ previous to application of the formula (20) to iterate the operations until the constraints are satisfied. On the other hand, if the constraint determination unit 62 determines that the constraints are satisfied, the constraint determination unit 62 supplies the transmit power value $P_{k,j}$ to the steepest descent method convergence determination unit 64, which in turn determines whether convergence conditions as presented below are satisfied, $$\begin{cases} \left\| \frac{\partial}{\partial P_{k,j}} F(u) \right\| = \left( \sum_{k=1}^{N} \sum_{j=1}^{M_r} \left| \frac{\partial}{\partial P_{k,j}} F(u) \right|^2 \right)^{1/2} < \varepsilon_1 \\ \left| \min_k C_k(u) - \min_k C_k(u-1) \right| < \varepsilon_2 \\ u > I_{max}, \end{cases} \quad (22)$$

where $$C_k = \sum_{j=1}^{M_r} \log_2(1 + SNR_{k,j}). \quad (23)$$

The parameter u represents the number of iterations in the steepest descent method, and the parameter $I_{max}$ is defined as the maximum number of iterations. Also, the parameters $\varepsilon_1$ and $\varepsilon_2$ are sufficiently small values. In other words, any of conditions specified in conditional clauses: if change in an objective function corresponding to change in transmit power is within a predefined sufficiently small value, if change in an original objective function corresponding to increments in iterations is within a predefined sufficiently small value, and if the number of iterations exceeds a predefined threshold, is satisfied, the iteration of steps in the steepest descent method is terminated.

Note that the above convergence conditions for the steepest descent method are illustrative and other convergence conditions may be used.

If the steepest descent method convergence determination unit 64 determines that neither of the constraints in the formula (22) is satisfied, the steepest descent method convergence determination unit 64 supplies the current transmit power value $P_{k,j}$ to the channel capacity calculation unit 53 for an additional iteration. The above operations are iterated until the steepest descent method convergence determination unit 64 determines that any of the conditions in the formula (22) is satisfied. On the other hand, if the steepest descent method convergence determination unit 64 determines that any of the conditions is satisfied, the steepest descent method convergence determination unit 64 supplies the transmit power value $P_{k,j}$ to the interior point method convergence determination unit 65, which in turn determines whether step iteration convergence constraints in the interior point method as presented below are satisfied, $$\begin{cases} r(i) < \varepsilon_3 \\ \left| \min_k C_k(i) - \min_k C_k(i-1) \right| < \varepsilon_4, \end{cases} \quad (24)$$

where the parameter i represents the i-th step iteration in the interior point method. Also, the parameters $\varepsilon_3$ and $\varepsilon_4$ are sufficiently small values. In other words, any of conditions specified in conditional clauses: if the barrier parameter is smaller than a predefined sufficiently small value, and if change in an original objective function corresponding to increments in the iterations is within a predefined sufficiently small value, is satisfied, the step iteration in the interior point method is terminated.

Note that the above convergence conditions for the interior point method are illustrative and other convergence conditions may be used.

If the interior point method convergence determination unit 65 determines that neither of the convergence conditions are satisfied, the current transmit power value $P_{k,j}$ is determines as the optimum solution under the barrier parameter r(i). The barrier parameter updating unit 66 decreases the barrier parameter in accordance with the formula (19) and supplies the updated barrier parameter r(i) and the $P_{k,j}$ to the barrier parameter multiplication unit 52 for an additional step iteration in the interior point method. On the other hand, if the interior point method convergence determination unit 65 determines that any of the convergence conditions is satisfied, the interior point method convergence determination unit 65 supplies the current transmit power value $P_{k,j}$ as the optimum solution of the optimization unit 22 to the transmit power control unit 14.

Figure 7:
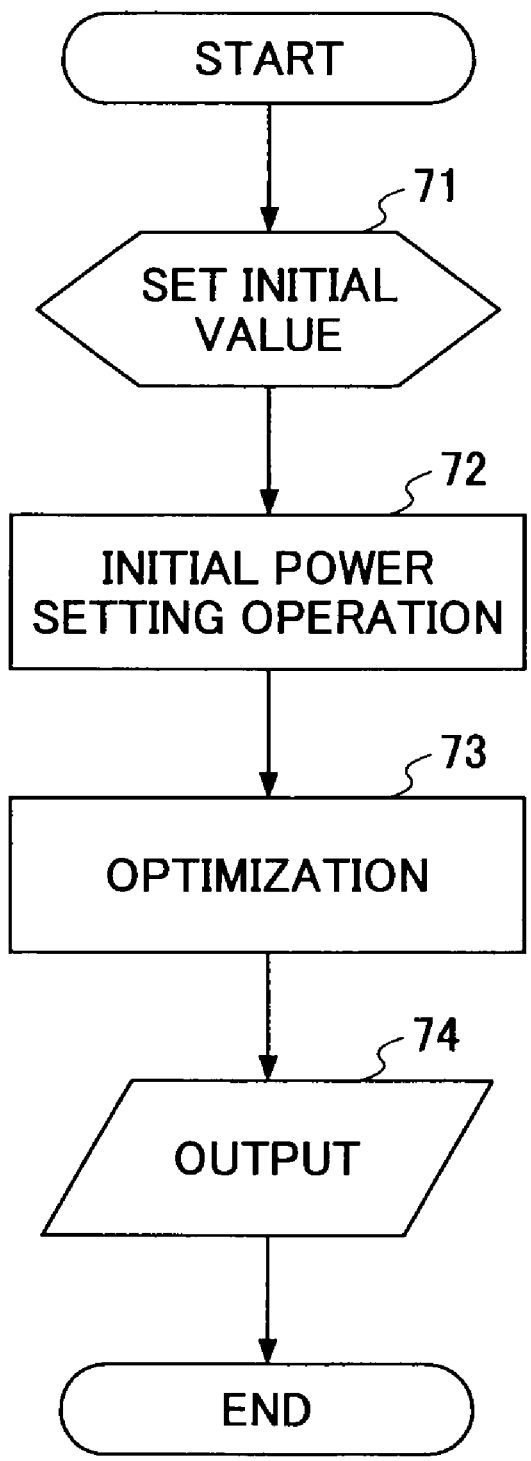
FIG. 7 is a flowchart of operations of the optimum transmit power calculation unit in the radio communication apparatus according to the first embodiment.

Exemplary operations of the optimum transmit power calculation unit 13 are described with reference to the flowchart in FIG. 7. In the optimum transmit power calculation unit 13, at step 71, the barrier parameter r(i), the maximum number of iterations $I_{max}$ in the steepest descent method and the parameters $\varepsilon_1$ to $\varepsilon_4$ are determined. At step 72, incoming transmit weight components $w_{k,q,j}$ are used to set the initial power allocation value $P_{initial}$ for the transmit power optimization problem in accordance with the formula (18). At step 73, the initial power allocation value $P_{initial}$, the eigenvalue $\lambda_{k,j}$ and the $w_{k,q,j}$ are used to solve the transmit power optimization problem. At step 74, the optimum transmit power calculation unit 13 outputs the optimum solution.

Figure 8:
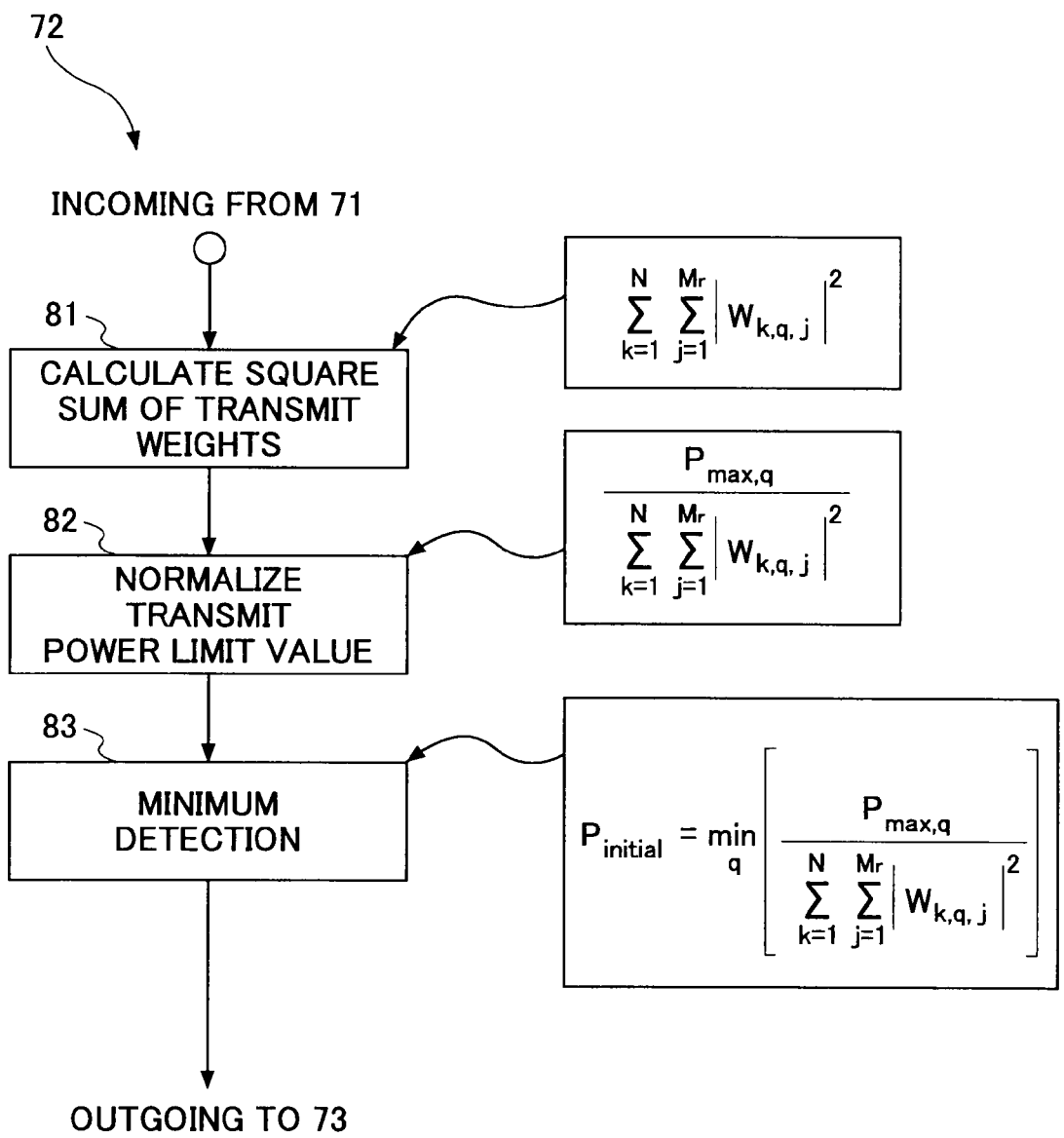
FIG. 8 is a flowchart of operations of the initial power setting unit in the optimum transmit power calculation unit in the radio communication apparatus according to the first embodiment.

Next, exemplary detailed operations in step 72 are described with reference to the flowchart in FIG. 8. At step 81, the incoming $w_{k,q,j}$ are used to calculate square sums of the $w_{k,q,j}$ for individual transmit antennas in accordance with the formula (16). At step 82, the $P_{max,q}$ is normalized with respect to the calculated square sums in accordance with the formula (17). At step 83, the minimum normalized $P_{max,q}$ is derived and set as the initial power allocation value $P_{initial}$ for the transmit power optimization problem, which is delivered to step 73.

Note that it is illustrative to set the minimum normalized $P_{max,q}$ as the initial power allocation value $P_{initial}$. In other embodiments, the initial power allocation value $P_{initial}$ may be evenly set to individual user streams based on values normalized in accordance with the formula (17). Alternatively, the initial power allocation value $P_{initial}$ may be set based on values normalized in accordance with any suitable function $h(w_{k,q,j})$ including the transmit weight components $w_{k,q,j}$.

Figure 9:
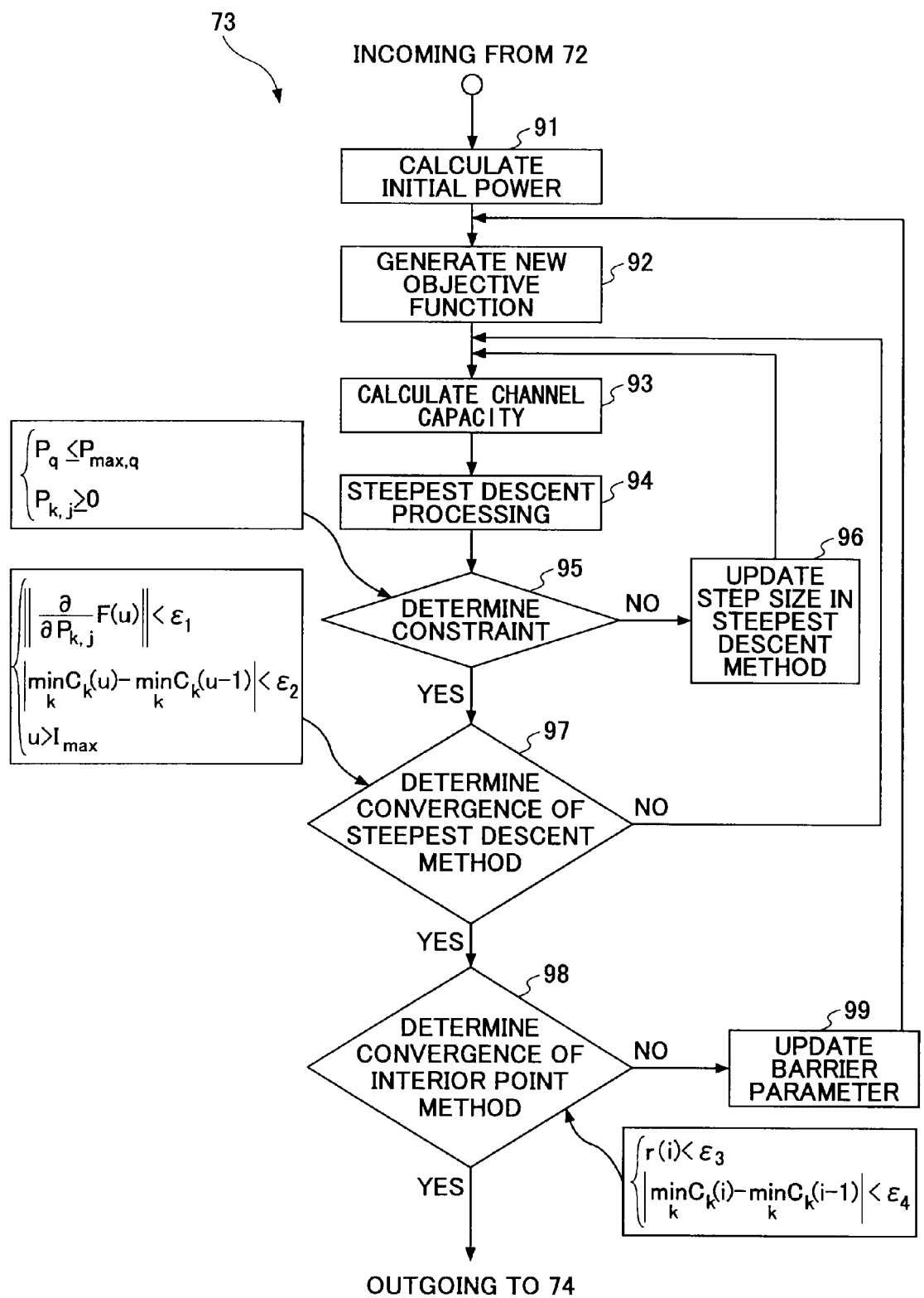
FIG. 9 is a flowchart of operations of the optimization unit in the optimum transmit power calculation unit in the radio communication apparatus according to the first embodiment.

Next, exemplary detailed operations in step 73 are described with reference to the flowchart in FIG. 9. At step 91, the incoming $P_{initial}$ is used to calculate transmit power values $P_q$ for individual transmit antennas. At step 92, the transmit power values $P_q$ are multiplied with the barrier parameter r(i) to generate an objective function F associated with a new optimization problem. At step 93, channel capacities for individual users are calculated. At step 94, a gradient of the objective function F, that is, a derivative of the objective function F, is derived based on the channel capacities, and a new $P_{k,j}$ is calculated in accordance with the formula (20). At step 95, transmit power values $P_q$ are calculated for the individual transmit antennas in accordance with the formula (16), and then it is determined whether the constraints in the formula (21) are satisfied. If it is determined that any of the constraints is not satisfied, at step 96, the step size β is decremented and delivered to step 93. At step 93, the same operation is performed under the updated step size β, and the above operations are iterated until the constraints are satisfied at step 95. On the other hand, if it is determined that all the constraints in the formula (21) are satisfied at step 95, at step 97, it is determined whether convergence conditions for the steepest descent method as specified in the formula (22) are satisfied. If it is determined that neither of the conditions as specified in the formula (22) is satisfied, the current transmit power value $P_{k,j}$ is delivered to step 93. At step 93, the same operation is performed under that transmit power value $P_{k,j}$, and the above operations are iterated until any of the conditions as specified in the formula (22) is satisfied at step 97. On the other hand, if it is determined that any of the conditions is satisfied, at step 98, it is determined whether step iteration convergence conditions in the interior point method as specified in the formula (24) are satisfied. If it is determined that neither of the convergence conditions as specified in the formula (24) is satisfied, the current transmit power value $P_{k,j}$ is determined as the optimum solution under the barrier parameter r(i). At step 99, the barrier parameter r(i) is decremented in accordance with the formula (19) and delivered together with the $P_{k,j}$ to step 92. At step 92, the same step iteration in the interior point method is performed again. On the other hand, if it is determined that any of the convergence conditions as specified in the formula (24) is satisfied, the current transmit power value $P_{k,j}$ is determined as the optimum solution in step 73 and delivered to step 74.

The optimization scheme in accordance with the interior point method through use of the steepest descent method has been described in conjunction with the above embodiment, but any other suitable optimization schemes may be used. Even in the other optimization schemes, the arrangement and flowchart illustrated in FIGS. 2 and 7 can be used to set the initial power allocation value for the transmit power optimization problem based on the precoding transmit weight components $w_{k,q,j}$ and realize the optimization through use of the initial power allocation value.

In the above optimization scheme, the optimization problem is solved such that channel capacities $C_k$ are made uniform over individual users. In other embodiments, the optimization problem may be solved such that channel capacity C for the overall system is maximized. In this case, the optimization problem is reformulated below, $$\text{maximize } C = \sum_{k=1}^{N} \sum_{j=1}^{M_r} \log_2(1 + SNR_{k,j}) \quad (25)$$

$$\text{s.t.} \sum_{k=1}^{N} \sum_{j=1}^{M_r} |w_{k,q,j}|^2 P_{k,j} \le P_{max,q} \quad (26)$$

$$P_{k,j} \ge 0 \;\; \forall k, j. \quad (27)$$

The optimization problem directed to maximize the channel capacity C for the overall system is referred to as Sum-rate criteria herein. The solution for that optimization problem is similar to Fairness criteria.

Figure 10:
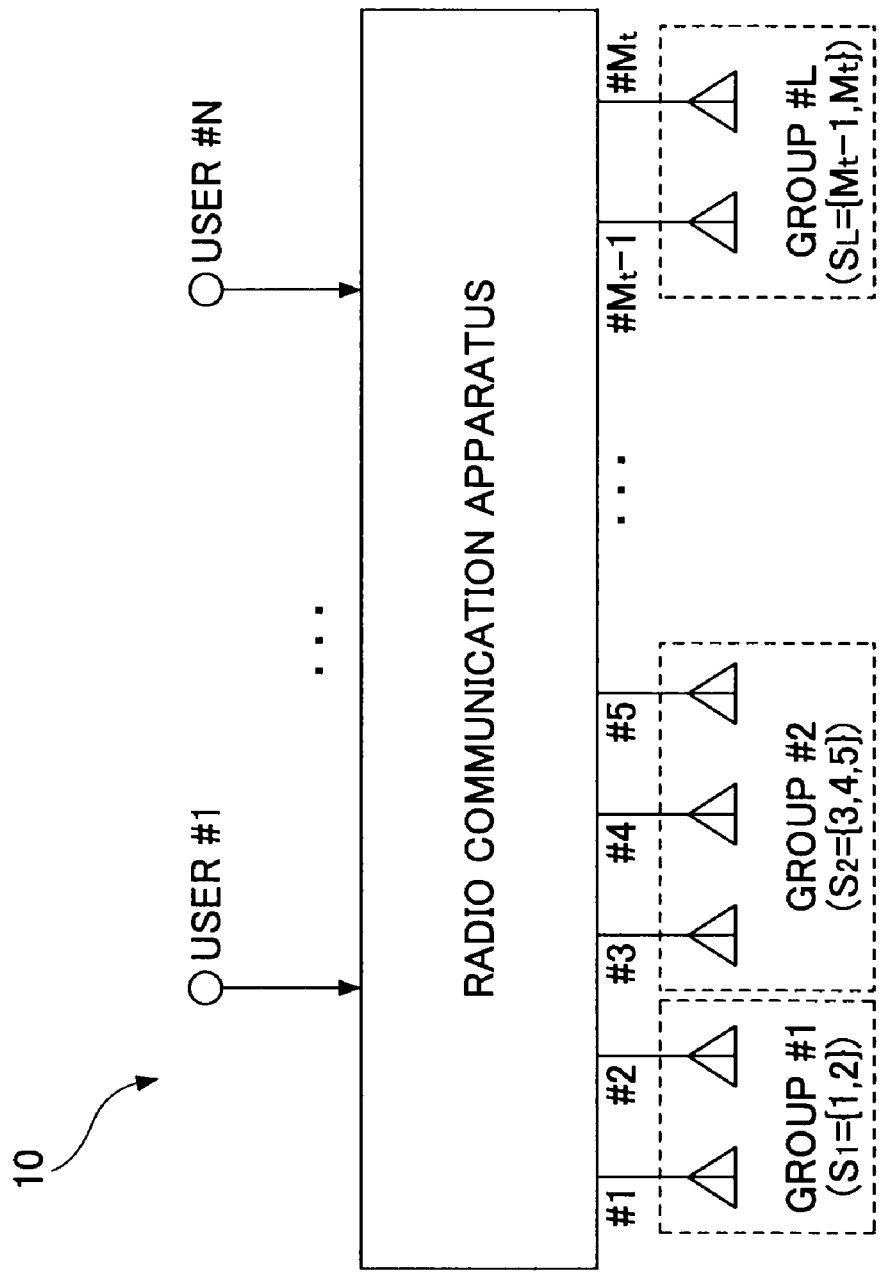
FIG. 10 schematically illustrates exemplary grouping of multiple transmit antennas in the radio communication apparatus according to the first embodiment.

In the above-mentioned embodiments, the power limit values $P_{max,q}$ are illustratively provided for individual transmit antennas. In other embodiments, transmit antennas may be grouped into several groups, and the power limit values may be provided for the individual groups. FIG. 10 illustrates exemplary groups of transmit antennas in a radio communication apparatus. In the illustration, the reference symbol L ($1 \leq l \leq L$) represents the group number, and the reference symbol $S_1$ represents a set of transmits antenna numbers belonging to the group 1. An optimization problem in accordance with the Fairness criteria for this embodiment is formulated, $$\text{maximize } \min_k C_k = \min_k \sum_{j=1}^{M_r} \log_2(1 + SNR_{k,j}) \quad (28)$$

$$\text{s.t.} \sum_{q \in S_l} \left[ \sum_{k=1}^{N} \sum_{j=1}^{M_r} |w_{k,q,j}|^2 P_{k,j} \right] \le P_{max,l} \quad (29)$$

$$P_{k,j} \ge 0 \;\; \forall k, j, \quad (30)$$

where the power limit value notation for group 1 is $P_{max,1}$. This optimization problem can be solved similar to the above-mentioned solution. Also, the optimization problem in accordance with the Sum-rate criteria can be also solved similarly.

In the above-mentioned embodiments, the BD-ZF scheme is illustratively applied for precoding, but the present principle can be applied to transmit power optimization problems through use of other precoding schemes.

Second Embodiment

In the first embodiment, it is assumed that multiple transmit antennas are installed on a radio communication apparatus. In the second embodiment, multiple transmit antennas may be located separately from a radio communication apparatus and be coupled to the radio communication apparatus in a wired and/or wireless manner.

Figure 11:
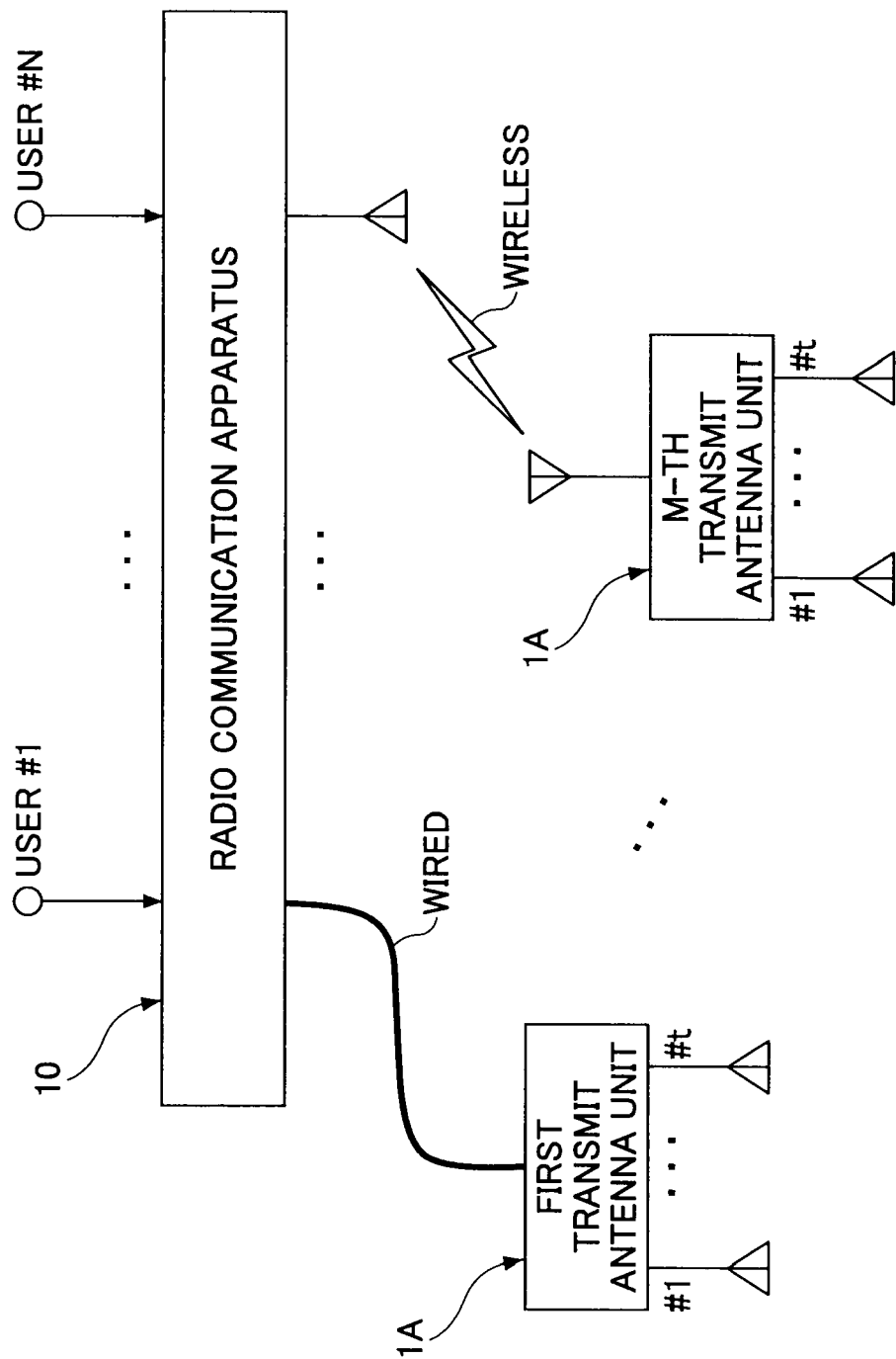
FIG. 11 schematically illustrates an exemplary arrangement of a radio communication apparatus according to a second embodiment.

FIG. 11 illustrates a radio communication apparatus according to the second embodiment of the present invention. A radio communication apparatus 10 is coupled to transmit antenna units 1As each having multiple transmit antennas in a wired and/or wireless manner.

In operation, the radio communication apparatus 10 may operate in a similar manner to that of the first embodiment except that the radio communication apparatus 10 is located separately from the transmit antenna units 1As.

[Application Instance]

An exemplary application instance for the first embodiment as mentioned above is described below. In order to validate the effectiveness of the present principle, some computer simulation results are illustrated for the first embodiment where the BD-ZF is applied for precoding and uniform power limit values $P_{max}$ are set for individual transmit antennas. Also, the barrier function as specified in the formula (14) is used for this simulation. Further, it is assumed that the number $M_t$ of transmit antennas is equal to 6, the number N of users is equal to 2, the number $M_r$ of user antennas is equal to 3, and three streams are space-multiplexed and transmitted for each user. Also, it is assumed that the power limit values $P_{max}$ is equal to ⅙ for each transmit antenna, and the total usable transmit power is equal to 1. Further, 10,000 patterns of MIMO channel matrixes are used for optimization and then averaged. For the channel environment, it is assumed that MIMO channels for individual users are independent identically distributed (i.i.d.) Rayleigh fading. Other parameters are set below: $r(0)=10^{-5}$, $\alpha=0.05$, $I_{max}=2000$, $\epsilon_1=10^{-6}$, $\epsilon_2=10^{-11}$, and $\epsilon_3=10^{-3}$. Note that the parameter $\epsilon_4$ is set to 0 to observe convergence in the present simulation.

Figure 12:
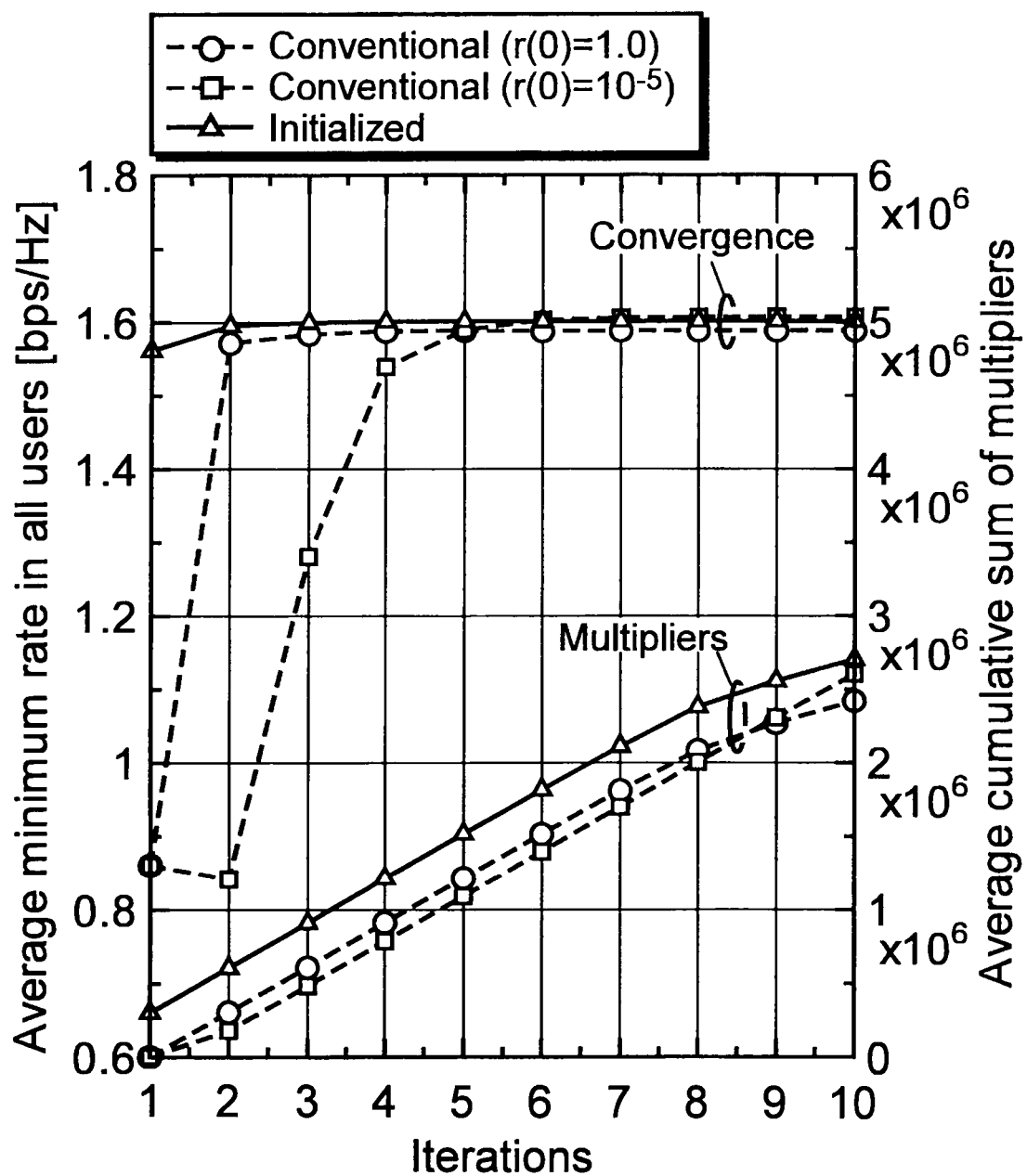
FIG. 12 illustrates convergence performances and computational complexity associated with the convergence in accordance with Fairness criteria according to the present invention.

FIG. 12 illustrates exemplary results of optimization under the case where a sufficiently small initial power allocation value ($P_{initial}=10^{10}$) is set as well as convergence for the optimization and multiplier performances of the first embodiment in accordance with the Fairness criteria. In the case of the sufficiently small initial power allocation value, the parameter r(0) is set to 1.0 or $10^{-5}$. In this illustration, the "Conventional" illustrates performances of the optimization under the sufficiently small initial allocation value, and the "Initialized" illustrates performances of the optimization according to the first embodiment. Also, the "Convergence" represents the channel capacity for a user with the minimum channel capacity at step i in the interior point method in the left-hand vertical axis. On the other hand, the "Multipliers" represents the accumulated number of multiplications in the right-hand vertical axis. The horizontal axis represents the number i of step iterations in the interior point method.

In FIG. 12, in comparison between the "Conventional" with $r(0)=10^{-5}$ and the "Initialized" according to the first embodiment, the "Conventional" requires smaller numbers of step iterations and multipliers until the convergence but has a lower convergence value. On the other hand, in comparison between the "Conventional" with $r(0)=1.0$ and the "Initialized" according to the first embodiment, if the convergence value is set to 1.60, the "Conventional" and the "Initialized" have the numbers of multipliers $1.40\times10^6$ and $0.91\times10^6$, respectively, at the respective convergence points (i=6 for the "Conventional" and i=3 for the "Initialized"), resulting in reduction about 35%.

Figure 13:
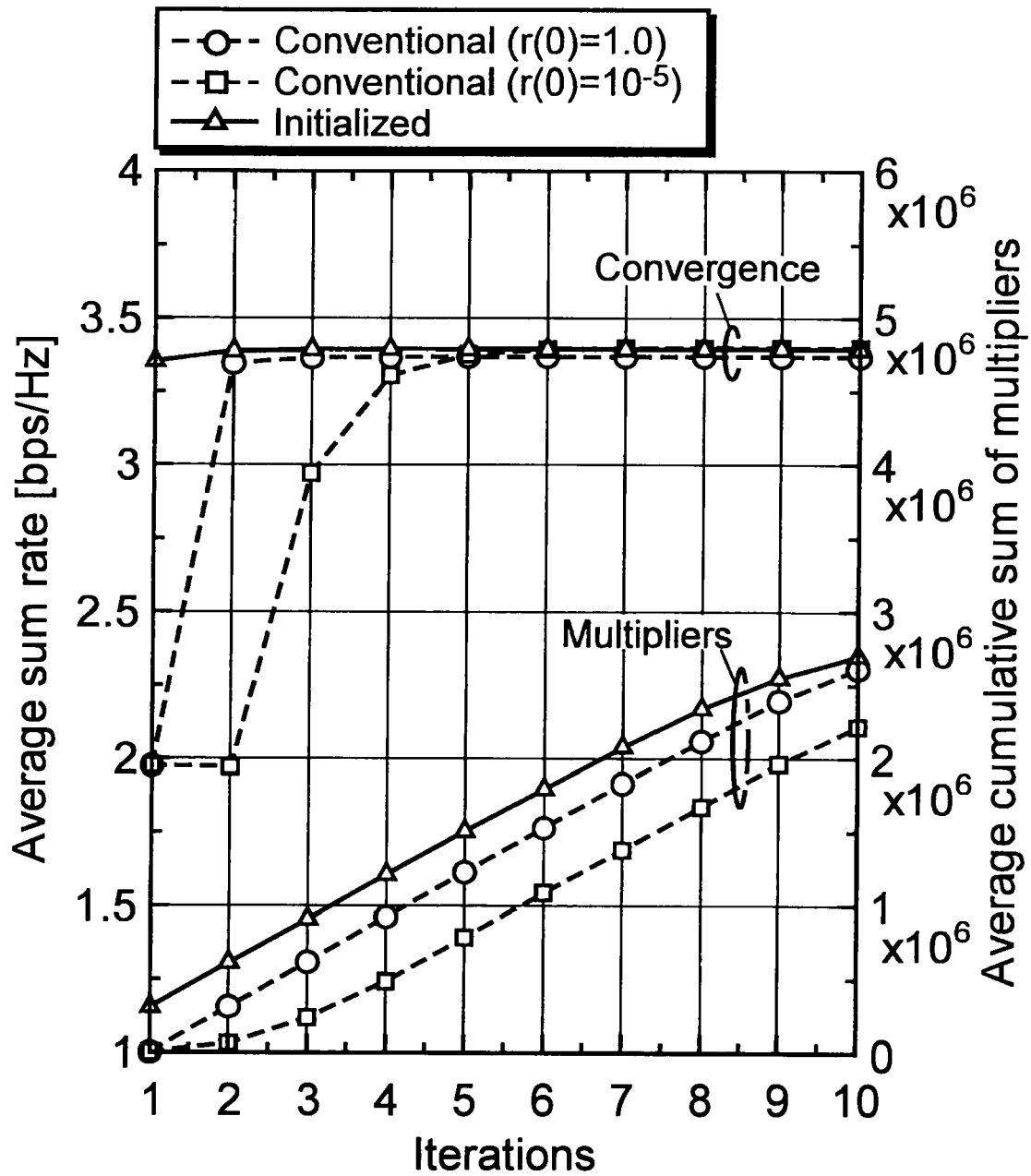
FIG. 13 illustrates convergence performances and computational complexity associated with the convergence in accordance with Sum-rate criteria according to the present invention.

FIG. 13 illustrates exemplary results of optimization under the case where a sufficiently small initial power allocation value ($P_{initial}=10^{-10}$) is set as well as convergence for the optimization and multiplier performances of the first embodiment in accordance with the Sum-rate criteria. In the case of the sufficiently small initial power allocation value, the parameter $r(0)$ is set to 1.0 or $10^{-5}$. In this illustration, the "Conventional" illustrates performances of the optimization under the sufficiently small initial allocation value, and the "Initialized" illustrates performances of the optimization according to the first embodiment. Also, the "Convergence" represents an overall system channel capacity at step i in the interior point method in the left-hand vertical axis. On the other hand, the "Multipliers" represents the accumulated number of multiplications in the right-hand vertical axis. The horizontal axis represents the number i of step iterations in the interior point method.

In FIG. 13, in comparison between the "Conventional" with $r(0)=10^{-5}$ and the "Initialized" according to the first embodiment, the "Conventional" requires smaller numbers of step iterations and multipliers until the convergence but has a lower convergence value. On the other hand, in comparison between the "Conventional" with $r(0)=1.0$ and the "Initialized" according to the first embodiment, if the convergence value is set to 3.39, the "Conventional" and the "Initialized" have the numbers of multipliers $1.09\times10^6$ and $0.91\times10^6$, respectively, at the respective convergence points (i=6 for the "Conventional" and i=3 for the "Initialized"), resulting in reduction about 17%.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This application is based upon and claims the benefit of priority of the prior Japanese Patent Application No. 2008-125342, filed on May 12, 2008, the entire contents of which are incorporated herein by reference.

What is claimed is:

1. A radio communication apparatus for transmitting a radio signal to multiple users via multiple transmit antenna groups at appropriate transmit power levels, each of the transmit antenna groups including one or more transmit antennas, the transmit antenna groups having respective transmit power constraints comprising:
   a precoding unit configured to perform precoding on signals modulated for individual users and generate transmit weights;
   an optimum transmit power calculation unit configured to receive the transmit weights from the precoding unit and use components of the transmit weights and respective transmit power limit values for the transmit antenna groups to calculate an initial value for a transmit power optimization problem for calculation of the appropriate transmit power levels for the users; and
   a transmission unit configured to transmit radio signals at the calculated transmit power levels,
   wherein the initial value is used to solve the transmit power optimization problem in an iterative manner in accordance with an interior point method, and
   wherein the initial value results from normalization of the respective transmit power limit values for the transmit antenna groups with a square sum of the components of the transmit weights.

2. The radio communication apparatus as claimed in claim 1, wherein the initial value comprises a minimum of values for the transmit antenna groups, the values resulting from normalization of the respective transmit power limit values for the transmit antenna groups with the square sum of the components of the transmit weights.

3. The radio communication apparatus as claimed in claim 1, wherein the optimum transmit power calculation unit is configured to use the interior point method combined with a steepest descent method to perform optimization under the constraints.

4. The radio communication apparatus as claimed in claim 3, wherein
   the optimum transmit power calculation unit is configured to terminate step iteration in the steepest descent method if any of conditions is satisfied, and
   the conditions include a condition of change in values of an objective function derived in accordance with the interior point method with respect to change in transmit power levels being within a predefined threshold, a condition of change in values of an original objective function for the transmit power optimization problem with respect to an increment of the step iteration being within a predefined threshold, and a condition of the number of step iterations exceeding a predefined threshold.

5. The radio communication apparatus as claimed in claim 3, wherein the optimum transmit power calculation unit is configured to terminate step iteration in the interior point method if any of conditions is satisfied,
   the conditions include a condition of a barrier parameter for the interior point method being smaller than a predefined threshold, and a condition of change in values of an original objective function for the transmit power optimization problem with respect to an increment of the step iteration being within a predefined threshold.

6. The radio communication apparatus as claimed in claim 1, wherein the optimum transmit power calculation unit is configured to perform optimization under the constraints to make respective channel capacities for the users uniform.

7. The radio communication apparatus as claimed in claim 1, wherein the optimum transmit power calculation unit is configured to perform optimization under the constraints to maximize channel capacity for an overall system.

8. A radio communication method for transmitting a radio signal to multiple users via multiple transmit antenna groups at appropriate transmit power levels, each of the transmit antenna groups including one or more transmit antennas, the transmit antenna groups having respective transmit power constraints, the method comprising:

performing precoding on signals modulated for individual users and generating transmit weights;

receiving the transmit weights from the precoding unit and using components of the transmit weights and respective transmit power limit values for the transmit antenna groups to calculate an initial value for a transmit power optimization problem for calculation of the appropriate transmit power levels for the users; and transmitting radio signals at the calculated transmit power levels, wherein the initial value is used to solve the transmit power optimization problem in an iterative manner in accordance with an interior point method, and wherein the initial value results from normalization of the respective transmit power limit values for the transmit antenna groups with a square sum of the components of the transmit weights.

9. The radio communication method as claimed in claim 8, wherein the initial value comprises a minimum of values for the transmit antenna groups, the values resulting from normalization of the respective transmit power limit values for the transmit antenna groups with the square sum of the components of the transmit weights.

10. The radio communication method as claimed in claim 8, wherein the calculation comprises using the interior point method combined with a steepest descent method to perform optimization under the constraints.

11. The radio communication method as claimed in claim 10, wherein the calculation comprises terminating step iteration in the steepest descent method if any of conditions is satisfied, and the conditions include a condition of change in values of an objective function derived in accordance with the interior point method with respect to change in transmit power levels being within a predefined threshold, a condition of change in values of an original objective function for the transmit power optimization problem with respect to an increment of the step iteration being within a predefined threshold, and a condition of the number of step iterations exceeding a predefined threshold.

12. The radio communication method as claimed in claim 10, wherein the calculation comprises terminating step iteration in the interior point method if any of conditions is satisfied, the conditions include a condition of a barrier parameter for the interior point method being smaller than a predefined threshold, and a condition of change in values of an original objective function for the transmit power optimization problem with respect to an increment of the step iteration being within a predefined threshold.

13. The radio communication method as claimed in claim 8, wherein the calculation comprises performing optimization under the constraints to make respective channel capacities for the users uniform.

14. The radio communication method as claimed in claim 8, wherein the calculation comprises performing optimization under the constraints to maximize channel capacity for an overall system.

* * * * *